(12) United States Patent
Reep (10) Patent No.: US 7,710,269 B2
(45) Date of Patent: May 4, 2010

(54) SYSTEMS AND METHODS TO PREVENT COUNTERFEIT, GREY AND BLACK MARKET PROLIFERATION OF PHARMACEUTICAL, MEDICAL AND OTHER PRODUCTS

(75) Inventor: Paul Reep, Marina Del Rey, CA (US)

(73) Assignee: University of Southern California, Los Angeles, CA (US)

( * ) Notice: Subject to any disclaimer, the term of this patent is extended or adjusted under 35 U.S.C. 154(b) by 673 days.

(21) Appl. No.: 11/622,135

(22) Filed: Jan. 11, 2007

(65) Prior Publication Data
US 2008/0169926 A1    Jul. 17, 2008

(51) Int. Cl.
*G08B 13/14* (2006.01)
(52) U.S. Cl. .............. 340/572.1; 340/10.41; 235/435; 235/457; 235/6; 523/100; 523/210; 206/459.5; 206/460; 206/461
(58) Field of Classification Search ........... 340/572.1, 340/10.41, 500, 540; 235/435, 457, 6; 428/402, 428/220, 1.1–1.62; 424/400; 523/210; 435/6, 435/41, 42, 405; 206/459.5, 460, 461
See application file for complete search history.

(56) References Cited

U.S. PATENT DOCUMENTS

| | | | | |
|---|---|---|---|---|
| 6,085,903 | A * | 7/2000 | Jotcham et al. | 206/459.5 |
| 6,312,911 | B1 * | 11/2001 | Bancroft et al. | 435/6 |
| 2004/0099740 | A1 * | 5/2004 | Chresand et al. | 235/457 |
| 2004/0166520 | A1 * | 8/2004 | Connolly | 435/6 |
| 2005/0110614 | A1 * | 5/2005 | Coates et al. | 340/10.41 |
| 2005/0277710 | A1 * | 12/2005 | Joyce et al. | 523/210 |
| 2006/0289640 | A1 * | 12/2006 | Mercure et al. | 235/435 |
| 2007/0264481 | A1 * | 11/2007 | DeSimone et al. | 428/220 |
| 2009/0028910 | A1 * | 1/2009 | DeSimone et al. | 424/401 |
| 2009/0220789 | A1 * | 9/2009 | Desimone et al. | 428/402 |

* cited by examiner

*Primary Examiner*—George A Bugg
*Assistant Examiner*—Sisay Yacob
(74) *Attorney, Agent, or Firm*—Kirton & McConkie; Michael F. Krieger (57) ABSTRACT

An identifying coding apparatus employing modulated reflectance technology involving a base station emitting a RF signal, with a tag, located remotely from the base station, and containing at least one antenna and predetermined other passive circuit components, receiving the RF signal and reflecting back to the base station a modulated signal indicative of characteristics related to the tag.

33 Claims, 4 Drawing Sheets

SYSTEMS AND METHODS TO PREVENT COUNTERFEIT, GREY AND BLACK MARKET PROLIFERATION OF PHARMACEUTICAL, MEDICAL AND OTHER PRODUCTS

BACKGROUND

1. Field of the Invention

The present invention relates to the use of Radio Frequency Identification Devices (RFID) in combination with Deoxyribonucleic Acid (DNA). Some embodiments utilize reader systems with standoff capability, as well as other, back-end MIS infrastructure tools for tracking, tracing and authentication requirements.

2. Background

The requirement to remotely track and trace an item, and relate it to a particular place on the globe is not new, but the method of doing so more efficiently is discussed below, as well as a method to insure the item is genuine and authentic, providing a chain of custody, as well as forensic evidence of same.

For a number of reasons that relate to product quality, inventory control, security and safety, the need to track, trace, and authenticate a particular product, commodity or specific process has increased during recent times. For example, it is known that dangerous unapproved or counterfeit drugs pose a serious safety risk. In a recent study conducted by the Food and Drug Administration (FDA) and U.S. Customs and Border Protection (CBP) a series of spot examinations of mail shipments of foreign drugs to the U.S. were conducted in order to target, identify, and stop counterfeit and potentially unsafe drugs from entering the United States. The spot examinations revealed that these shipments often contain dangerous unapproved or counterfeit drugs that pose potentially serious safety problems. According to the FDA, of the 1,153 imported drug products examined, the overwhelming majority, 1,019 (88%), were violative because they contained unapproved drugs. The FDA further indicated that many of these imported drugs could pose clear safety problems. The World Health Organization ("WHO") estimates that counterfeit drugs account for ten percent of all pharmaceuticals. That number can rise to as high as 60% in developing countries.

Taggants may be used to track various products. A taggant can mean a radio frequency microchip used in automated identification and data capture (i.e., RFID.) In such cases, electronic devices use radio waves to track and identify items, such as pharmaceutical products, by assigning individual serial numbers to the containers holding each product. This technology has been utilized in an effort to prevent the diversion or counterfeiting of drugs by allowing wholesalers and pharmacists to determine the identity and dosage of individual products. A taggant may also be a chemical or physical marker added to materials to allow various forms of testing. They generally consist of microscopic particles built up in many layers, which are made of different materials. Taggants allow testing marked items for qualities such as lot number and concentration.

DNA can provide discrete verification, when associated with a particular item, and can be authenticated using Polymerase Chain Reaction (PCR), other wet chemistry or laboratory protocols. DNA has not been highly successful as a security tag, or marker for detection and product authentication for a number of disparate reasons. DNA, regardless of its origin has fundamental problems with stability over time— largely caused by exposure to ambient Ultra Violet radiation. DNA is considered expensive and time consuming to authenticate, and must be sent to a laboratory for analysis using a Polymerase Chain Reaction (PCR.) These factors have greatly limited the adoption of DNA markers and tags for practical implementation.

Radio Frequency Identification (RFID) may be used to provide an automatic identification method, relying on storing and remotely retrieving data using devices called RFID tags or transponders. An RFID tag is an object that can be attached to or incorporated into a product, animal, or person for the purpose of identification using radio waves. Chip-based RFID tags contain silicon chips and antennas. RFID cards are also known as "proximity", "proxy" or "contactless cards" and come in three general varieties: passive, semi-passive (also known as semi-active), or active. Passive tags require no internal power source, whereas active tags require a power source.

Passive RFID tags have no internal power supply. The minute electrical current induced in the antenna by the incoming radio frequency signal provides just enough power for the integrated circuit in the tag to power up and transmit a response. Most passive tags signal by backscattering the carrier signal from the reader. This means that the antenna has to be designed to both collect power from the incoming signal and also to transmit the outbound backscatter signal. The response of a passive RFID tag is not necessarily just an ID number; the tag chip can contain non-volatile electronically erasable programmable read-only memory for storing data.

The lack of an onboard power supply means that the device can be quite small: commercially available products exist that can be embedded in a sticker, or under the skin in the case of low frequency RFID tags. Passive tags have practical read distances ranging from about 10 cm (4 in.) up to a few meters depending on the chosen radio frequency and antenna design/size. Due to their simplicity in design they are also suitable for manufacture with a printing process for the antennas.

Conventional active RFID devices are all digital devices that produce communication signals by active transmission between the RFID tag and the reader system. They require microprocessor and semiconductor, as well as battery power components, on each tag component. The tags must use layered silicone-based chips and are the large part of RFID tag costs. The industry has focused on miniaturization of the RFID tag components that in turn has led to increased complexity of power supplies and antenna systems.

Non-silicon tags made from polymer semiconductors are currently being developed by several companies globally. If successfully commercialized, polymer tags may be roll printable, and much less expensive than silicon-based tags. However, substantial technical and economic hurdles must be surmounted to accomplish such an end.

All of the embodiments disclosed herein are directed toward identification and location methods for persons and property. Although for different applications, each embodiment shares the primary concept of this invention.

SUMMARY

The present invention relates to systems and methods which utilize DNA and passive reflectance technology to acquire information about various products and/or persons. In particular, embodiments of the invention may be utilized to prevent counterfeit, grey and black market proliferation of pharmaceutical, medical and other products as well as systems and methods which may be utilized to identify and track various persons.

Some embodiments utilize an identifying coding apparatus employing modulated reflectance technology comprising a base station emitting a RF signal, with a tag, located remotely from the base station, and containing at least one antenna and predetermined other passive components, receiving the RF signal and reflecting back to the base station a modulated signal indicative of characteristics related to the tag. In preferred embodiments the passive components comprise DNA.

Some embodiments provide a long-range communications system which does not emit significant radiation in order to respond to a received signal.

In some embodiments of the invention, the passive reflectance tag can comprise deoxyribonucleic acid (DNA). In some embodiments, the method for making the passive reflectance tag can comprise depositing a plurality of layers of droplets on a product, wrapper or clothing. The droplets can comprise droplets of a particular DNA sequence disposed to form a specified structure. Multiple layers of different DNA sequences may be applied in succession to produce a unique tag. The method can further comprise removing selected droplets to form a micromechanical system capable of passive reflectance.

DETAILED DESCRIPTION OF EXEMPLARY EMBODIMENTS

This specification describes exemplary embodiments and application of the invention. The invention is, however, not limited to these exemplary embodiments and applications, or to the manner in which the exemplary embodiments and applications operate or are described herein. Moreover, the figures may show simplified or partial views, and the elements and the figures may be exaggerated or otherwise not proportioned for ease of illustration or clarity.

As the term "on" is used herein, one object (e.g., material, layer, DNA, ink, etc.) can be "on" another object regardless of whether the one object is directly on the other object or there are one or more intervening objects between the one object and the other object. Additionally directions (e.g., above, below, top, bottom, side, "x", "y", "z", etc.), provided are relative and provided solely by way of example and for ease of illustration and discussion, and not by way of limitation.

A DNA reader is a device for interrogating a DNA label to determine its signal and make the association with a unique or known class of signals.

A Deoxyribonucleic acid ("DNA") tag is a self-contained authentication label containing a mix of oligonucleotides that provides a unique signal when appropriately interrogated.

Although DNA sequences, DNA tags, DNA labels, and DNA readers are mentioned throughout the application, it should be understood that any nucleotide sequence, as well as any non-natural nucleic acid analog sequence, may be employed in this invention to create tags and labels. In addition, any reader capable of interrogating the DNA label or tag may be employed. Interrogation may include but is not limited to discerning nucleotide sequences, as well as non-natural nucleic acid analog sequences.

1. Operating Environment

Figure 1:
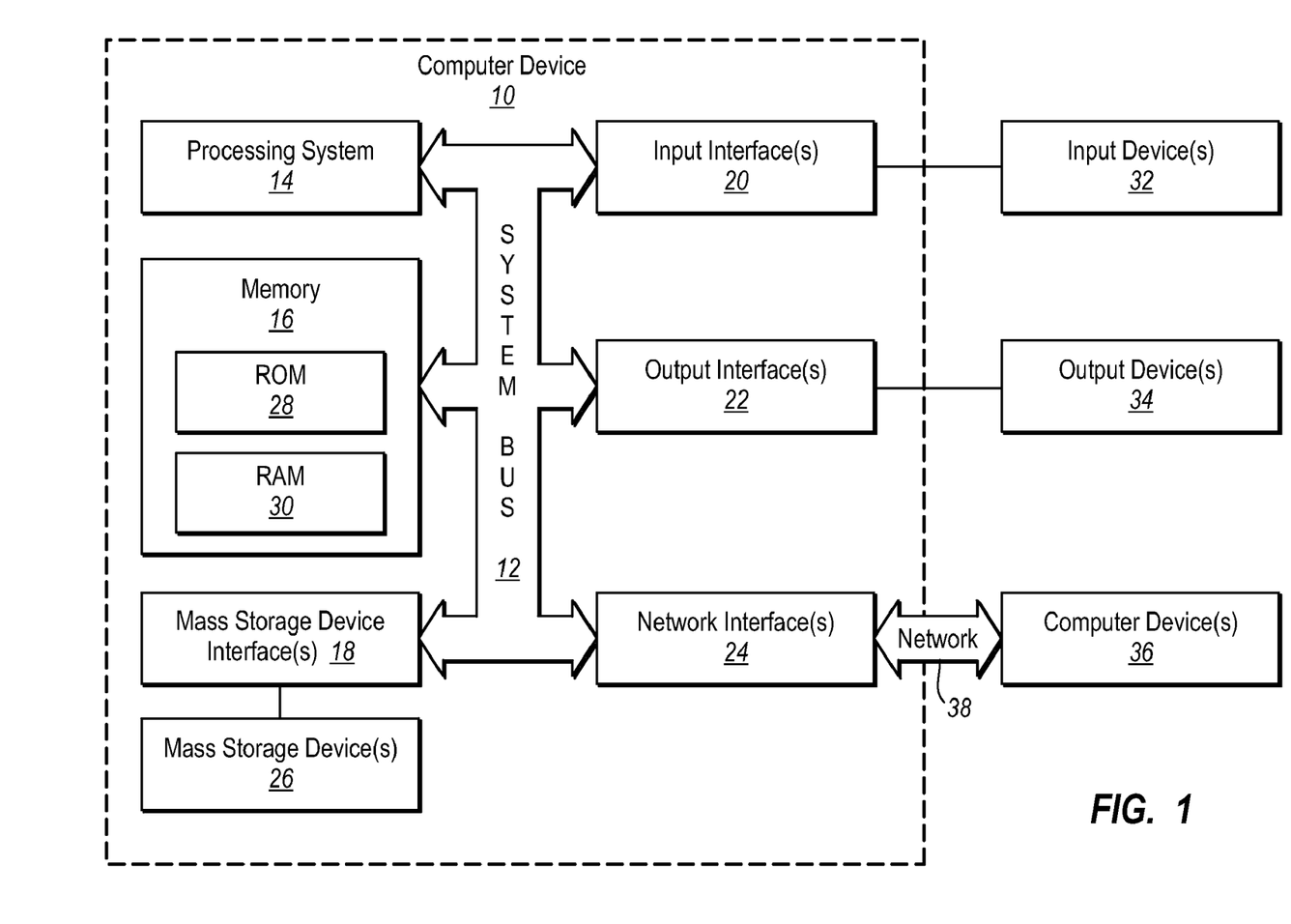
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

2. Superadjacent, Gated DNA/RIFD Taggants

For a number of reasons that may relate to product quality, inventory control, security and safety, the need to track, trace and authenticate a particular product, commodity or specific process has increased during recent times. The requirement to remotely track and trace an item, and relate it to a particular place on the globe is not new, but the method of doing so more efficiently is discussed below, as well as a method to insure the item is genuine and authentic, providing a chain of custody, as well as forensic evidence of same.

In preferred embodiments disparate technologies can be utilized in combination to provide specific, but separate functionality of the proposed invention.

DNA can provide discrete verification. Historically, DNA authentication of a particular item was executed by utilizing various Polymerase Chain Reaction (PCR) techniques or other wet chemistry or laboratory protocols. While PCR verification may be effective, this method may be slow and expensive to implement. RFID can provide an interactive platform to sense and track the location of an item, providing spatial, but not temporal or global positioning of the item. While signal verification may be used to ascertain or authenticate the item, digital signals are often unreliable, and can be mimicked or counterfeited, making absolute authentication unreliable for criminal prosecution, when RFID tags are utilized alone without other verification technologies. GPS technologies can provide the precise location of an item on the earth and in space. It also provides exact latitude/longitude/altitude, and very importantly date and time of day stamping of a measured/observed event. Telemetry and wireless reader systems can provide GPS and proprietary sensory data, and other information, with simultaneous transmission of authentication, location, and other data, but no forensic authentication exists in real-time.

Exemplary embodiments of the present invention integrate these functions into a superadjacent module, with a method of reading or interrogating the module to determine: where the item is located exactly in the world; what the item really is, by authenticating it forensically; who is authenticating the item; how long the item has been where it is; and other desirable data.

In preferred embodiments security tags are manufactured and read which are integrated and layered. One technology may be utilized to confirm the presence of another. Accordingly, in some embodiments multiple technologies need to be defeated to accomplish a counterfeit tag.

Preferred embodiments integrate specific DNA constructs with a conductive ink or pigment that is configured in a barcode or other similar structure that can be embedded onto a surface using lithography or inkjet printing techniques. The ink with the DNA can be overt or covert; creating a completely passive RFID/DNA marker that is/is not visible. According to some embodiments for the DNA to be printed within the RFID matrix, the DNA must be of a particle size between 1 and 3 microns to pass the orifice of an inkjet printer.

According to some embodiments it is desirable for the DNA to have sufficient stability, durability and robustness to remain viable for a substantial period of time and in preferred embodiments for a period of five (5) or more years. In preferred embodiments the DNA printed within the RFID matrix desirably has the capacity to withstand the rigors of severe industrial processing environments: temperature, humidity, harsh solvents, etc.

Under various embodiments of the present invention differing techniques may be utilized to produce DNA printed RFID tags which are robust and durable. In some embodiments the DNA may be encapsulating using polymorphic or other coating techniques. In preferred embodiments care may be taken to ensure that the encapsulated DNA remains small enough to be applied to a surface through an ink jet printer. If the size becomes unwieldy when in aqueous suspensions, such as solvents, pigments or inks, i.e. greater than 3 microns, buoyancy, stratification and other difficulty with specific gravity and molecular weight-related complexities arise, as well as complexities associated with undesirable chemical bonding and electrical charges.

As an alternative to or used redundantly with encapsulation in some embodiments specific DNA may be utilized in the printing process to produce robust and durable passive reflectant tags. In preferred embodiments, some embodiments utilize DNA species which are inherently more robust. For example, rare extremophilic bacterium, sourced from hydrothermal pools and glacial ice may be utilized. This highly resistive DNA extraction, reduces the need for heavier wall thicknesses of the encapsulating materials, and permits the use of smaller DNA constructs, at the same time.

Some embodiments of the present invention comprise the combination of a DNA product with another molecular tags or beacons. Examples of other molecular tags include tags that are reflective, absorptive, transmissive and/or conductive. Accordingly, some embodiments provide the ability to interrogate the RFID, and the DNA by a remote or hand-held signal generator reader system. Various reader systems may be utilized. For example UV, IR, UHF, VHF and/or other reader systems may be utilized. Alternatively, other novel beacons can be used such as boron, to facilitate neutron activation techniques, like those used to examine shipping containers.

In a non-limiting example conductive beacons may be utilized in association with the DNA and or RFID systems. For example ferromagnetic materials may be coupled with the RFID chemistry ink compounds. Accordingly, some embodiments create the necessary signal attenuation platform for the DNA, and also facilitated the manipulation and quantitative assay of the DNA as it is introduced, and mixed under rigorous quality and security control, into inks and applied to substrates. For example, this can be accomplished by simple electromagnetic process control technology.

In some embodiments, specific PPM prescriptions of the DNA/RFID tag are produced. Different DNA (or beacon) concentrations will produce different and specific signals, signifying a different attribute/product. Accordingly, the amount, type and layering structure of the DNA/beacon material may be varied to produce unique reflectant signaling. Variations in, and the strategic secure placement of this chemistry is virtually as limitless as the variations in the many possible DNA constructs themselves. Methods of producing variations in beacon architecture are discussed below. According to some embodiments, different configurations of DNA, preferably 100 base pairs to 1,000,000 base pairs, may be utilized. In some embodiments, tags may have different beacon molecules resident with the DNA constructs as well as various combinations of encapsulate chemistry, making forgery a virtual impossibility.

According to some embodiments of the present invention, passive reflectance tags are produced utilizing thin-film technology such that the tag has no microprocessor, semiconductor, or battery. According to some embodiments, the reader and tag communicate by a unique analog signal that is generated from a reader, which may be handheld, instead of the tag, using novel passive reflectance technology. In preferred embodiments the reader system emits and receives analog signals. Because, analog signals are far more difficult to duplicate, corrupt, or mimic, preferred embodiments utilize analog signals to maintain transmission of proprietary and encrypted communication signals.

Some embodiments utilize specific hybridization probes and beacons to select DNA which may be utilized to produce a stable DNA tag useful for detection and authentication; and in a particle size small enough for the most challenging covert applications. For example, the utilization of small target particle sizes may be particularly useful for tracking petrochemicals, bulk, or refined.

In preferred embodiments specific DNA may be selected, utilizing hybridization probes, from Archaebacteria or the extremophiles. Archaea like bacteria are single-celled organisms lacking nuclei and are therefore prokaryotes, classified as Monera in the alternative six-kingdom taxonomy. They were originally described in extreme environments, but have since been found in all types of habitats.

Many archaeans are extremophiles. An extremophile is an organism, usually unicellular, which thrives in or requires extreme conditions that would exceed optimal conditions for growth and reproduction in the majority of mesophilic terrestrial organisms. For Example, extremophiles can survive and thrive at even relatively high temperatures, often above 100° C., as found in geysers and black smokers. Others are found in very cold habitats or in highly-saline, acidic, or alkaline water. However, other archaeans are mesophiles, and have been found in environments like marshland, sewage, sea water and soil. Most extremophiles are microbes. The domain Archaea is known for widespread extremophile, but extremophiles are present in numerous and diverse genetic lineages of both the bacteria and archaea.

There are many different classes of extremophiles, each corresponding to the way its environmental niche differs from those of the majority of terrestrial mesophile organisms. Archaea are usually placed into three groups based on preferred habitat. These are the halophiles, methanogens, and thermophiles. Halophiles live in extremely saline environments. Methanogens live in anaerobic environments and produce methane. These can be found in sediments or in the intestines of animals. Thermophiles live in places that have high temperatures, such as hot springs. These classifications are not exclusive. Many extremophiles fall under multiple categories. For example, organisms living inside hot rocks deep under Earth's surface are both thermophilic and barophilic.

Recently, several studies have shown that archaea exist not only in mesophilic and thermophilic environments but are also present, sometimes in high numbers, at low temperatures as well. It is increasingly becoming recognized that methanogens are commonly present in low-temperature environments such as cold sediments. Some studies have even suggested that at these temperatures the pathway by which methanogenesis occurs may change due to the thermodynamic constraints imposed by low temperatures. Perhaps even more significant are the large numbers of archaea found throughout most of the world's oceans, a predominantly cold environment (Giovannoni and Stingl, 2005).

The use of particular DNA from organisms which possess the capacity to thrive in extreme environments provides some embodiments with desirable characteristics. For example, the use of extremophiles can allow the tag manufacturing process to include heat-curable and UV-curable inks, varnishes, etc. The use of such process usually increases mortality, denaturing or damage to most DNA. Accordingly, the selection of DNA that is heat resistant, or that possesses other desirable traits produces distinct advantages. The table below lists a series of organisms, each of which possess particular characteristics which may, when utilized to construct tags impart desirable characteristics.

| Term | Definition |
|---|---|
| Acidophile | An organism with an optimum pH level at or below pH 3. |
| Alkaliphile | An organism with optimal growth at pH levels of 9 or above. |
| Barophile | Bacteria which live in environments characterized by high gas or liquid pressure; synonymous with piezophile |
| Endolith | An organism that lives in microscopic spaces within rocks, such as pores between aggregate grains. These may also be called cryptoendoliths. This term also includes organisms populating fissures, aquifers, and faults filled with groundwater in the deep subsurface. |
| Halophile | An organism requiring at least 2M of salt, NaCl, for growth. |
| Hyperthermophile | An organism that can thrive at temperatures between 80-121° C., such as those found in hydrothermal systems. |
| Hypolith | An organism that lives inside rocks in cold deserts. |
| Lithoautotroph | An organism (usually bacteria) whose sole source of carbon is carbon dioxide and exergonic inorganic oxidation (chemolithotrophs) such as *Nitrosomonas europea*. These organisms are capable of deriving energy from reduced mineral compounds like pyrites, and are active in geochemical cycling and the weathering of parent bedrock to form soil. |
| Metalotolerant | Capable of tolerating high levels of dissolved heavy metals in solution, such as copper, cadmium, arsenic, and zinc. |
| Oligotroph | An organism capable of growth in nutritionally limited environments. |
| Osmophile | An organism capable of growth in environments with a high sugar concentration. |
| Piezophile | An organism that lives optimally at high hydrostatic pressure. See also Barophile. It is common in the deep terrestrial subsurface, as well as in oceanic trenches. |
| Polyextremophile | An organism that qualifies as an extremophile under more than one category. |
| Psychrophile/Cryophile | An organism that grows better at temperatures of 15° C. or lower. Common in cold soils, permafrost, polar ice, cold ocean water, and in/under alpine snowpack. |
| Radioresistant | Resistant to high levels of ionizing radiation, most commonly ultraviolet radiation, but also includes organisms capable of resisting nuclear radiation. |
| Thermophile | An organism that can thrive at temperatures between 60-80° C. |
| Xerophile | An organism that can grow in extremely dry, desiccating conditions. This type is exemplified by the soil microbes of the Atacama Desert. |

As an example some tags may be constructed with specialized DNA, which imparts desirable traits to the tag during manufacture and/or use. For example DNA may be isolated and cultures from ubiquitous thermoacidophilic archaeon from deep-sea hydrothermal vents. As hot, acidic and reduced hydrothermal fluids mix with cold, alkaline and oxygenated sea water, minerals precipitate to form porous sulphide-sulphate deposits. These structures provide microhabitats for a diversity of prokaryotes that exploit the geochemical and physical gradients in this dynamic ecosystem.

In addition to neutrophiles, and acid tolerant strains, new microbes have been isolated from the vents that are extreme thermoacidophilic microbes, which grow at pHs between 3.3 and 5.8 and at temperatures of 55-75° C. Supplemental Table 1 contains published reports of the presence of DHVE2 in archaeal clone libraries. Supplementary Table 2 illustrates sites on the EPR and ELSC where DHVE2 16S rDNA gene sequences were detected using primers specific for DHVE2 and by sequencing bands from DGGE gels.

SUPPLEMENTARY TABLE 1

Published reports of the presence of DHVE2 in archaeal clone libraries.

| Location | Lat/long | Sample | % clone library | Example clone | Genbank Accession # | Sample type | Ref |
|---|---|---|---|---|---|---|---|
| Axial Volcano (Juan de Fuca Ridge), North Pacific Ocean | 46° N, 130° W | 33-PA99 | 6.7 | 33-P127A99 | AF355837 | hydrothermal fluids | 6 |
| Axial Volcano (Juan de Fuca Ridge), North Pacific Ocean | 46° N, 130° W | 33-PA98 | 6.1 | 33-P23A98 | AF355840 | hydrothermal fluids | 6 |
| Guaymas Basin (Sea of Cortez), Pacific Ocean | 27° N, 110° W | G26 | 4.9 | G26_C73 | AF356637 | hydrothermal chimney | 7 |
| East Pacific Rise 9° N | 9° 50' N, 104° 18' N | CH | 1.5 | clone CH8_7a | AY672495 | hydrothermal chimney | 8 |
| East Pacific Rise 13° N, Pacific Ocean | 12° 48' N, 104° W | pEPR | ND* | pEPR122 | AF526963 | hydrothermal sample | 3,9 |

SUPPLEMENTARY TABLE 1-continued

Published reports of the presence of DHVE2 in archaeal clone libraries.

| Location | Lat/long | Sample | % clone library | Example clone | Genbank Accession # | Sample type | Ref |
|---|---|---|---|---|---|---|---|
| Myojin Knoll (Izu-Ogasawara Arc), North western Pacific Ocean | 32° 06' N, 139° 52' E | pMC2 | 33.0 | pMC2A24 | AB019736 | hydrothermal chimney | 10 |
| Myojin Knoll (Izu-Ogasawara Arc), North western Pacific Ocean | 28° 34' N, 140° 38' E | pSSMCA | 4.8 | pSSMCA108 | AB019740 | hydrothermal chimney | 10 |
| Iheya Basin (Middle Okinawa Trough), Northwestern Pacific Ocean | 27° 32' N, 126° 58' E | pISA | 29.8 | pISA12 | AB019741 | hydrothermal sediments | 10 |
| Pacmanus (Manus Basin), Western Pacific Ocean | 03° 43' S, 151° 40' E | pPACMA | 6.8-22.9 | pPACMA-M | AB052983 | hydrothermal chimney | 11 |
| Snake Pit (Mid-Atlantic Ridge), Atlantic Ocean | 23° 22' N, 44° 57' W | VC2.1 | 4.0 | VC2.1 Arc6 | AF068817 | hydrothermal sample | 12 |
| Edmond Vent Field (Central Indian Ridge), Indian Ocean | 23° S, 69° E | FT17A | 93.0 | FT17A03 | AY251064 | hydrothermal chimney | 13 |
| TOTO caldera (Mariana Volcanic Arc), Western Pacific Ocean | 12° 42' N, 143° 32' E | TOTO | 35.7 | TOTO-A6-12 | AB167486 | hydrothermal chimney | 14 |
| Cascadia Margin-eastern Pacific-Deep Marine Sediments, Eastern Pacific Ocean | 44° 34' N, 125° 04' W | 1251 | ND* | ODP1251A15.24 | AB177273 | Deep marine sediments (123-304 mbsf) | 15 |

*not determined

SUPPLEMENTARY TABLE 2

Sites on the EPR and ELSC where DHVE2 16S rRNA gene sequences were detected using primers specific for DHVE2 and by sequencing bands from DGGE gels (e.g, Supplementary FIG. 1). Thirty-six of sixty-three samples collected on three separate cruises that were tested using PCR and DGGE were positive for DHVE2.

| Sample Type (# of different samples containing DHVE2/total samples tested)* | Site | Lat/Long |
|---|---|---|
| East Pacific Rise (EPR)[16] | | |
| Outer 3 mm soft sulfides (1/1) | SW vent area | 21°50 N, 109°07'W |
| Outer 1-3 mm edges (1/1) | Lvent | 9°46.3N, 104°16.7'W |
| Outer1-3 mm crust (1/1) | E vent | 9°33.5 N, 104°14.9'W |
| Outer 1 mm crust of turret (1/1) | Robin's Roost | 9°50 N, 104°17.5'W |
| Multiple samples, iron oxides, outer ~2 mm (3/3) | F vent | 9°16.18'N, 104°13.1'W |
| Outer1-3 mm crust (1/2) | p vent | 9°50.3' N, 104°17.5'W |
| Outer ~2 mm crust (1/3) | Marker 22 | 9°50.3' N, 104°17.5'W |
| Outer ~2 mm crust (1/2) | C vent | 9°38.9' N, 104°15.5'W |
| Outer (~2 mm) and middle sections (~1 cm) of chimney (3/5) | Bio9 | 9°50.3' N, 104°17.5'W |
| Outer iron oxide and sulfur crust 1-2 mm (1/2) | Ty | 9°50.3' N, 104°17.5'W |
| Outer 1-2 mm sulfur crust (1/2) | Bio9" | 9°50.3' N, 104°17.5'W |
| Soft beehive structure (2/2) | Alvinellid Pillar | 9°50 N, 104°17'W |
| Outer 1-2 mm sulfur crust (1/3) | Biovent | 9°51 N, 104°17'W |
| Outer ~2 mm black crust (2/2) | M vent | 9°51 N, 104°18'W |
| Outer 1-2 mm iron oxide crusts (1/1) | A vent | 9°46.5' N, 104°17.5'W |
| ESLC[17,18] | | |
| Outer ~1-3 mm sulfur crust (1/4) | Kilo Moana | 20°3.2'S 176°8'W |
| Outer ~1-3 mm sulfur crust (4/4) | Tow Cam | 20°19.1'S 176°8.2'W |

SUPPLEMENTARY TABLE 2-continued

Sites on the EPR and ELSC where DHVE2 16S rRNA gene sequences were detected using primers specific for DHVE2 and by sequencing bands from DGGE gels (e.g, Supplementary FIG. 1). Thirty-six of sixty-three samples collected on three separate cruises that were tested using PCR and DGGE were positive for DHVE2.

| Sample Type (# of different samples containing DHVE2/total samples tested)* | Site | Lat/Long |
|---|---|---|
| Outer ~1-3 mm sulfur crust (2/2) | ABE | 20°45.7S', 176°34.1'W |
| Outer ~1-3 mm sulfur crust (4/4) | Tui Malila | 21°59.4'S, 176°34.1'W |
| Outer ~1-3 mm sulfur or iron oxide crust (4/7) | Mariner | 22°10.8'S, 176°36.1'W |

*samples where no DHVE were detected in this screen are not included in this table.

Some embodiments are capable of electronic enablement. The printing process for applying DNA to a substrate may be useful for producing electronic devices. For example the methods of the present invention may be utilized to produce a printed circuit board. In a non-limiting example, a device printed according to the methods of the present invention may be utilized as a secure "gatekeeper" to other electronics. The reader and tag can be used as an access control system, with secure DNA/RFID "surface-mount" personal identification cards. Access control can be broadened to include bank cards, vehicle ignitions, etc; not just building and facility access control systems.

Additionally, some embodiments utilize complex RFID architectures, where the DNA is printed into the RFID architecture, using different DNA for different sectors of the RFID, adding yet another layer of encryption. This can be done as discussed below in section three, with layers from different ink jets or a combination of ink jet on DNA embedded lacquer. Such multiple layered security tags, are inherently more robust and counterfeit resistant, because a user can use the forensic (PCR) periodically to audit or confirm that the RFID is actually performing and functioning properly, and is unadulterated.

In some embodiments substrates other than packaging materials, paper, metal, etc., may be printed on. For example, the methods of the present invention may be utilized to produce security labels which may be die-cut with frangible patterns, tamper-evident, multi-part, and hologram labels. Moreover, some embodiments comprise a tag wherein the DNA/RFID tag on top. For example, a tag may be manufactured where the RFID signal changes if the label is pulled apart, in pieces or in whole, or is tampered with. Similarly, in other examples the DNA/RFID may be placed under the label as a component of the adhesive, where tampering may be detected, and if the label is removed, there is sufficient material resident on the packaging for detection and testing as well.

In some embodiments DNA/RFID decals and transfers can be used, where the DNA and/or RFID can be discretely transferred overtly or covertly. An example may be tag placement on the inside of a windshield or a vehicle which may be utilized for various purposes. For example such a tag may be utilized for OEM and Warranty verification, and certifying repair parts from OEM for collision shops for insurance purposes, etc.

Some embodiments comprises an architecture for implementing a product that protects consumers from receiving incorrect or counterfeit products such as black/grey market prescription drugs, medication or other products that might pose a health and safety risk, or other hazard.

Some embodiments of the product comprise the use of a coating that could be, starch-based or other food-grade polymer to form a shell or jacket, that encompasses entirely the end-use product-unit dose. The jacket may be fabricated/molded in such a way, that it is just slightly larger than the tablet or object to be protected. The jacket is colored, color coded, or marked to indicate that the jacket is to be removed just prior to using, consuming or installing the object. The jacket also protects the physical integrity and the active ingredients from environmental degradation and mechanical damage.

As an example, the product could be a protective unit dose jacket that has been embedded with a molecular marker, such as DNA or other taggant/marker, which, upon accidental ingestion is dissolvable, harmless and composed of botanical, food-grade or suitable organic materials that are Generally Regarded As Safe (GRAS.) Just prior to ingesting the medication, the consumer, by instructive literature contained on primary and secondary packaging, is guided how to separate or break the jacket to access the unit dose. The jacket material can then be analyzed or tested for authenticity, in the home or at a commercial laboratory. This process guarantees the unit dose jacket matches the medication that is being ingested or introduced to the user. The product can be used to authenticate any pharmaceutical at any point of inspection for import, export or any point in the distribution and channel management process.

The DNA label may also be added to liquid medication, so the medication itself is "read" to authenticate the medication (the amount of DNA added in a label is small enough that no side effects will occur).

3. Methods of Making Superadjacent, Gated DNA/RIFD Taggants

Embodiments of the present invention may be produced by a plethora of modalities. In preferred embodiments an ink jet printer may be utilized as described below, however, it is important to note that other modes of transfer may be utilized to place the desired tag on the desired substrate. For example various inks, coatings and varnishes may be utilized with other mediums such as lithography, heat transfer, silkscreen, etc.

Figure 2:
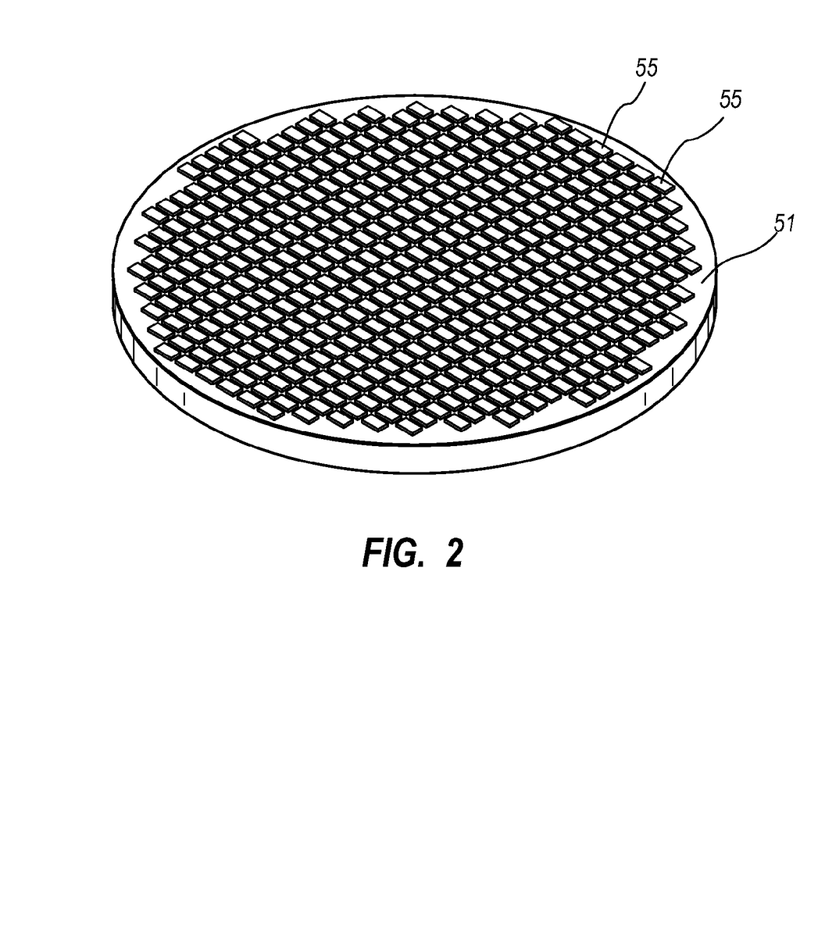
FIG. 2 illustrates an example of a series of tags constructed on a substrate.

FIG. 2 illustrates an exemplary substrate 51 on which have been fabricated a plurality of tag 55 as is known in the field. As is known, the tag 55 can comprise a base substrate onto which a tag maybe integrated.

FIGS. 3-9 illustrate an exemplary process for making a tag 55 according to some embodiments.

Figure 3:
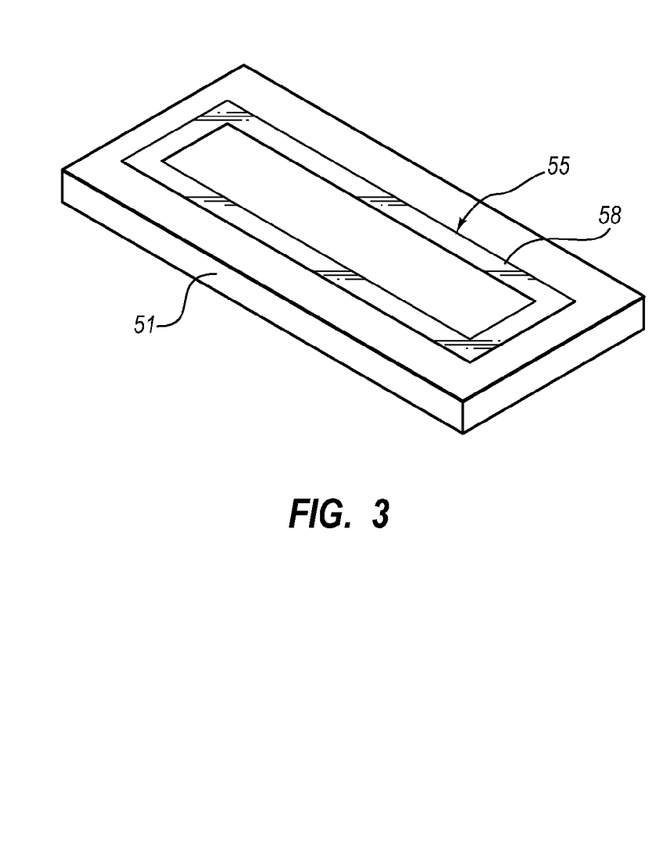
FIG. 3 illustrates an example of a tag with a layer of droplets applied to the substrate.

FIG. 3 illustrates a tag 55. As mentioned above, the structure can be fabricated on the tag 55 before or after the tag 55 is singulated from the substrate 51 (see FIG. 2). Thus, the tag 55, shown in FIG. 3, can be part of the unsingulated substrate 51 or can be a separated die 5 singulated from the wafer 1. If tag 55 is part of the unsingulated substrate 51, similar structures can be simultaneously or sequentially fabricated on a plurality or all of tag 55 of the substrate 51. Similarly, if tag 55 is singulated, the tag 55 can nevertheless be processed with other singulated tags 55 such that similar structures can be simultaneously or sequentially fabricated on a plurality of the tags 55.

Figure 4:
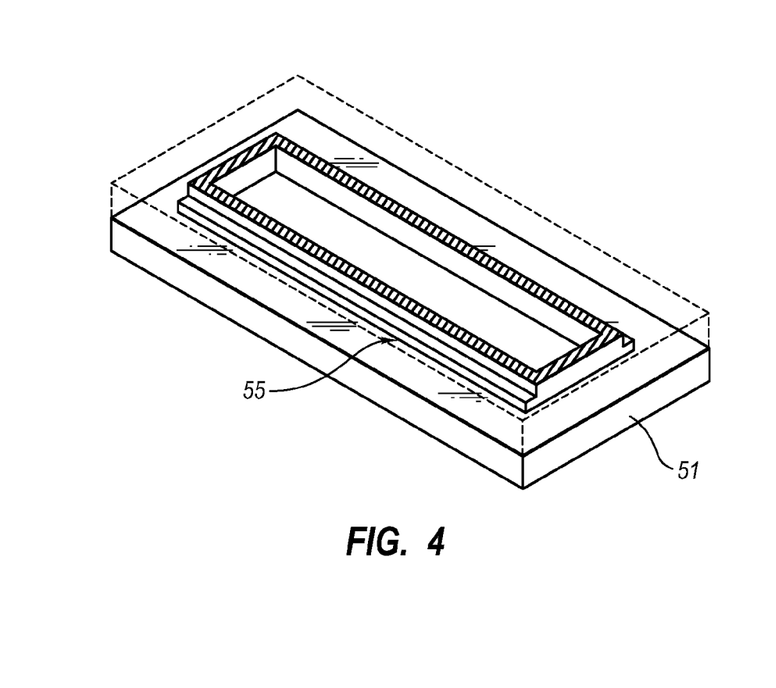
FIG. 4 illustrates an example of a partially constructed tag.

As shown in FIG. 4, conductive base layer 58 can be provided or fabricated on the tag 55. As will be seen, the base layer 58 can facilitate deposition of materials forming the tag 55. The base layer 58 can comprise one or more materials. For example, the base layer 58 can comprise DNA that maybe adhered (e.g. glued), printed onto, or otherwise fastened to the tag 55. As another example, material forming the base layer 58, can be deposited onto the tag 55. For example, one or more materials comprising the base layer 58 can be deposited onto the tag 55 using electroplating, chemical vapor deposition, physical vapor deposition, sputter deposition, electroless plating, electron beam deposition, evaporation (e.g., thermal evaporation), flame spray coating, plasma spray coating, ionic plating, etc. As yet another example, the base layer 58 can be formed by depositing paste or pastes onto the tag 55 and then curing or otherwise allowing the paste or pastes to harden and form the base layer 58. The paste or pastes composing the base layer 58 can be deposited onto the tag 55 in a desired shape of the base layer 58, or the paste or pastes can be patterned after being deposited onto the tag 55. For example, portions of the paste or pastes deposited onto the tag 55 can be removed to shape the portions of the paste or pastes on the die 55 in a desired form of the base layer 58.

Figure 5:
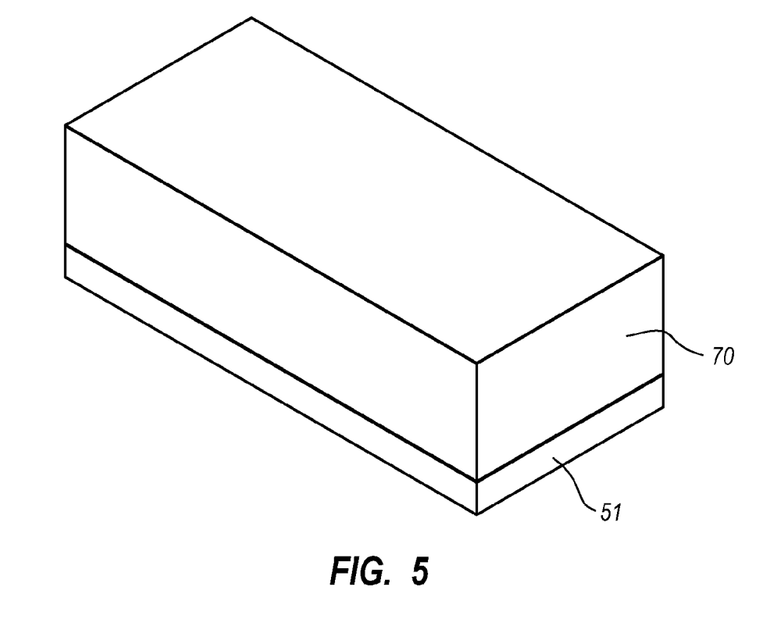
FIG. 5 illustrates an example of a tag with all of the layers of droplet disposed on a substrate.
Figure 6:
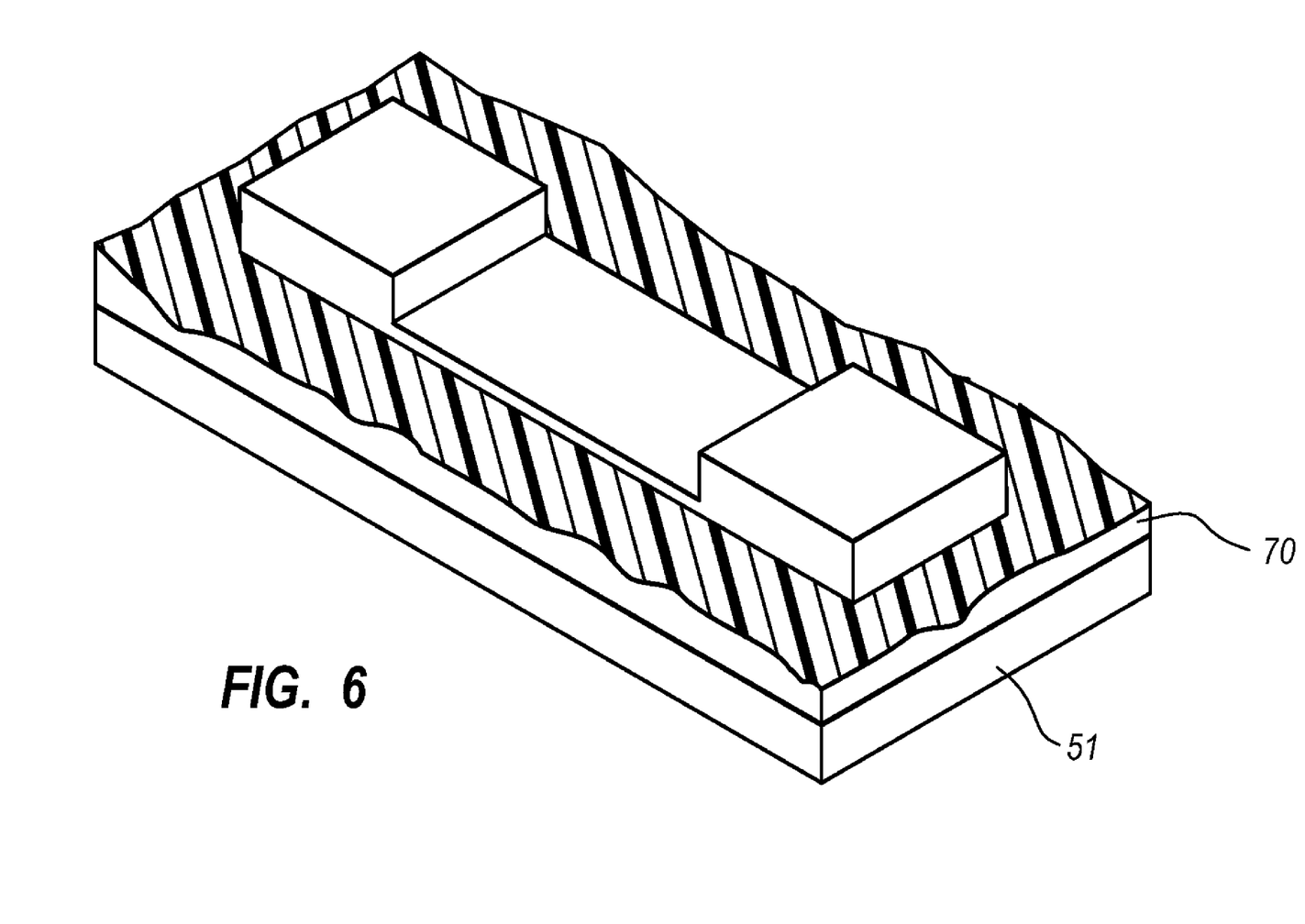
FIG. 6 illustrates an example of a tag wherein some of the droplets previously disposed on the substrate have been washed away.

A plurality of layers of droplets can then be deposited on the tag 55, forming an array of droplets. FIG. 4 shows the tag 55 after deposition of some of the layers of droplets forming a partial array 49 of droplets, and FIG. 5 shows the tag 55 after deposition of all of the layers of droplets forming a full array 70 of droplets on the tag 55. Thereafter some of the droplets can be selectively removed, leaving others of the droplets that form structures 36, 38, as shown in FIG. 6.

The array 70 can include droplets comprising different materials having different properties. For example, some of the droplets in the layers can comprise materials that are soluble in a particular solvent, and others of the droplets can comprise materials that are generally insoluble in that particular solvent. Some droplets may contain one type of DNA while other droplets contain other types of DNA. As another example, some of the droplets can comprise a material or materials that are electrically conductive and others of the droplets can comprise material or materials that are not appreciable electrically conductive.

In the exemplary process illustrated in FIGS. 3-6, the layers of droplets deposited on tag 55 can include droplets comprising DNA droplets that are dissolvable in a first solvent, and droplets that are not appreciably dissolvable in the first solvent but may be dissolvable in a second solvent.

Examples of suitable materials for the structural droplets include, without limitation, polymers, polyphenylene sulphides, polyimides, polypherimides, polyether-etherketones, epoxy resins, polyetones, and mixtures or materials containing the foregoing.

As can be seen in the Figures, as the initial layers of droplets are deposited on the tag 55 forming a partial array 49 of droplets on the tag 55, structure droplets can be deposited in locations on tag 55 and in the partial array 49 to form structural features that define the positions and shapes of the structures 10 shown in FIGS. 3-6. Conductive droplets or droplets containing DNA can be deposited to form conductive seed layers on the structural features As will be seen, the structural features and seed layers can compose support structures on which the structures of can be made.

As shown in the Figures, as the layers of droplets continue to be deposited on the tag 55 completing formation of the full array 70 of droplets on the tag 55, droplets can continue to be deposited in locations on the tag 55 and in the partial array 49 to complete formation of the structural features that define the positions and shapes of the detectable structures, which may include unique passive reflectance structures and DNA droplets can continue to be deposited to complete formation of conductive layers 3-2 on the structural features. As mentioned above, the structural features and DNA layers form unique structures which may be detected by the methods discussed below including technology associate with RFID tags.

The structure, conductive/DNA, and fill droplets that comprise the array 70 of droplets can be deposited on the tag 55 in any manner suitable for depositing droplets of different materials in a three-dimensional array. In a non-limiting example, automated spray heads (not shown) can be used to deposit the droplets. For example, an ink jet print head (not shown) can be used to deposit the droplets.

Once the layers of droplets are deposited on the tag 55 forming the full array 70, the fill droplets can be removed. For example, the fill droplets can be removed by washing the array 70 with the solvent that dissolves the fill droplets, as discussed above. As also discussed above, that solvent can be selected so as not to dissolve or remove appreciable amounts of the structural droplets or conductive droplets that form the support structures. Washing or removing the fill droplets 43 can leave the support structures. As shown, support structures 36, each comprising structural features and DNA, can be left on each of the tag 55.

As discussed above, the DNA layers and support structures can comprise DNA or electrically conductive droplets. Material forming the unique passive reflectance structures may also comprise DNA, conductive material or other datable materials. Once material forming the unique passive reflectant structures have been deposited onto base 8 and support structures, the structural features of the support structures can be removed by washing away or dissolving the structural droplets that form the structural features. The DNA layers of the support structures can likewise be removed in part to produce unique patterns or structures which contain DNA by washing away or dissolving the droplets that form the DNA layers. Alternatively, the DNA layers can be left in place. Regardless of whether the DNA layers 32-42 are washed away or left in place, the result can be a unique tag 55 with integrally formed unique passive reflectance structures and/or a unique passive reflectance signal.

The material deposited onto the substrate may be applied by an ink jet printer onto but can be deposited by other methods. For example, material forming the unique passive reflectant structures can be deposited using methods such as chemical vapor deposition, physical deposition, sputter deposition, electro less plating, electron beam deposition, evaporation (e.g. thermal evaporation), flame spray coating, plasma spray coating, ionic plating, etc. During deposition, the various layers can be dispensed with, and the material forming the structures can be deposited directly onto the structural features of the tag 55.

4. Methods of Detecting and Authenticating Superadjacent, Gated DNA/RIFD Taggants Embodiments of the present invention utilize modulated reflectance techniques to remotely identify and locate persons and property. Initially it should be understood that use of the word "passive" herein relates to circuit components that need no power source to operate and that are not semi-conductor components.

Modulated reflectance is a technology that has multiple uses for low power RF telemetry and communication applications of many types. A full description of basic modulated reflectance operation is contained in U.S. Pat. No. 6,434,372, issued Aug. 13, 2002, to Neagley et al, and U.S. Pat. No. 7,095,311, issued Aug. 22, 2006, to Coates et al. The basic principles of modulated reflectance, as described in the issued patent above, are: 1. The "base unit" sends a carrier RF signal to a "remote unit", also known as the reflector unit. 2. The "remote unit" modulates the RF signal and reflects a portion of the modulated signal back to the "base unit." 3. The "base unit" receives the modulated signal from the "remote unit," completing two-way communication.

The advantages of the modulated reflectance technology are many, but one of the most important is the fact that the "remote unit" requires either no or minimal power to reflect the signal back to the "base unit." Therefore, in many cases, the "remote unit" does not require batteries or other sources of electrical power. This is an important advantage for portable or remotely located modulated reflection devices. These features of modulated reflectance make it of use in many applications. The present invention applies the technology in diverse situations in which remote monitoring of persons or equipment without a power source on the remote unit is important.

As a companion invention, reader systems specific to the above maybe used. For example reader systems may comprise: fluor/luminescence beacon rate of decay for authentication; standoff distances from product to reader as another layer of security; reading of companion, redundant or combination tags, such as covert and overt tags in proximity with one another; triangulation between tags for detection, authentication and positioning; and nuclear activation/decay.

One embodiment of the present invention is the use of multi-frequency RF interrogation of a tag according to the present invention from an interrogation RF base unit. As shown in U.S. Pat. No. 7,095,311, the tag may contain multiple antennas. Each antenna has associated with it an impedance respectively connected to the feed points of the antennas, that serve to control the characteristics of the reflected signal for the particular resonant frequency of an antenna. As an example, one antenna, tuned to respond uniquely, (e.g. full power reflectance in phase or 180 degrees out of phase) at several different frequencies would also represent the technology.

In actual use, each antenna also is tuned to reflect an electromagnetic wave of a specific resonant frequency. The associated load impedances determine each antenna's ability to reflect its tuned frequency. That is, the more closely a particular load impedance matches the feed point impedance of its antenna, the less energy will be reflected by that antenna. This is because when the load impedance matches the feed point impedance, the energy of the incident wave is transferred to the load rather than being reflected.

A signature is created in the reflected signal that can be distinguished from other signals in the receiver. A very large number of signatures can be created since there are large numbers of combinations of load impedances and frequencies usable with the present invention; this variation is enhanced by the use of varying structures and compositions of material deposited onto the tag 55. Accordingly, the present invention contemplates utilizing, amongst other variables, DNA in designated concentrations to produce unique and recognizable RF feedback signals.

As stated, the relative amplitude of reflected signals may be used to determine a code identifying a particular user. By having a select frequency that resulted in no attenuation, a calibration amplitude reflected at that frequency can be used as a reference amplitude. Therefore, the other frequencies' reflected amplitudes are judged in relation to the reference amplitude. The attenuation of other frequencies is accomplished by creating feed point-load impedance mismatches. In terms of amplitude alone three conditions result in the greatest amplitude reflected to a receiver: a load impedance of zero, a short, or from an impedance mismatch of infinity, an open, on the particular antenna.

The least reflected amplitude is from an antenna whose load impedance matches the feed point impedance of the antenna. In this case, no energy is reflected to a receiver. Varying the load impedances provides the mismatch between these two extreme values varies the fraction the total incident RF energy in the load impedance, varying the amplitude of the reflected wave.

Although coding can be readily accomplished using reflected amplitudes, it can also be accomplished using wave polarization and phase information.

In addition to the above-described signaling techniques, different time delays can be used. For a particular frequency, an antenna can have associated with it a time delay circuit, having a capacitance and inductance. The matching impedance of the antenna is either an open, a short, or an attenuating load impedance. However, the time required for the reflected signal to be reradiated from the circuit would be unique. The delay circuit in the antenna can be as simple as long printed cable-type structure, or it can be inductors and/or capacitors creating the time delay, where the delay is controlled by varying the values of "L" and "C" in the circuit. The delay circuit also can be a cascade of multiple time delay elements to increase the delay time.

Another embodiment of the present invention involves the use of a capacitor in the load circuit in such a way that a charge stored on the capacitor affects the frequency response of the load circuit. This change in frequency response of an antenna provides another technique for encoding information for practice of the present invention.

The charge in these capacitors can be changed remotely through application of several techniques including direct contact with electrodes on a label, inductive charging and discharging through the use of printed inductive coils on the label, and by RF charging from a distance. This ability to re-encode labels is useful for updating information such as expiration dates, new pricing and new disposition of a particular item. As will be discussed below, this technique also can be used to disable a modulated reflectance tag.

In practice of the invention, capacitors can be used as a primitive clock. The amount of time a capacitor takes to become fully discharged depends on the amount of charge stored in the capacitor and the value of the resistance through which it is discharging. The discharge rate can be hard wired into the tag circuit to meet specified requirements. To improve the accuracy of the clock function, the interrogating RF base unit can observe the rate of discharge over time, comparing the rate of its own internal clock, and develop a calibration rate for a specific label. Label calibration can account for variations due to differences in circuit parameters between different labels. This calibration technique relaxes the requirements of accuracy and precision of the label manufacturing process, since the interrogating unit can "learn" the discharge rate of a specific label. The technique also can be used to indicate when a "trigger" capacitor charge level has been reached. Commercial items such as expiration dates and freshness can be monitored in this way.

Still another embodiment of the present invention uses oscillating circuits that, when activated by an interrogating RF base unit signal, cause a complex, pulsating signal to be reflected, which is another form of modulation. This pulsating signal provides another method of encoding that adds to the "alphabet" that a label can use to communicate to an RF bar code system. Typical oscillating circuits are constructed easily using antennas, capacitors, inductors, and resistances that also can be easily printed as discussed in U.S. Pat. No. 7,095,311. This ability also is useful for expanding the selectivity of the reflecting antennas 52 and the "alphabet" of encoding "letters."

In summary, it should now be clear to those with skill in this art that several techniques exist with which to create complex, unique signatures for RF labels using modulated reflectance technology. These techniques include, but are not limited to, using a number of antennas tuned to slightly different frequencies, using antennas turned either fully off and fully on, using antennas with variable reflectance tuned by variable impedance loads of various values, by using pulsating reflected signals from antennas with oscillating circuits driving the antennas, delay-line circuits on certain antennas, using pulsating circuits for time variant signals, applying unique materials with unique reflectance (e.g. DNA from extremophilo), and phased antenna configurations that reflect phased signals.

Among the highly useful features of the present invention is the ability to locate, relative to a known reference point, a particular tag or label in the physical environment. Identifying the location of particular tag, be it on an item of commerce for sale, on a piece of equipment, on a medicine bottle, or an a doctor in a hospital, for example, can be achieved by known radar techniques and triangulation using data collected by multiple RF base stations. Additionally, many of the same features can be accomplished through the use of a single wide-frequency antenna with associated tuned circuits.

Embodiments provide a public key cryptography, where two "keys" for encoding and decoding transmitted information are created for a user. The first key is called the public key, which is used for encoding information intended for use by the user. As the name implies, this is not a secret key, and anyone can have access to it, such as banks and creditors. However, after encoding with a public key, the encoded information cannot be decoded by anyone other than the user using a private key. This private key information can be encoded with a modulated reflectance label on something like a credit card, which the user would carry on his person. This card would be read along with the other items that the user wants to purchase.

The information from the private key is used to unlock pertinent bank information, and the transaction is completed transparently with regard to the user. Anti-fraud techniques, such as a PIN, or requiring a PIN could be employed for greater financial security, but such techniques are not transparent to the user. Another technique is to have the private key label split physically into two parts that could be carried in different locations, and the user would have to be in possession of both parts to validate and complete a purchase.

Still another application of the present invention is in remote telemetry applications. One such remote telemetry application is in the monitoring of the condition of property. In this application, a modulated reflectance device or tag is placed inside a shipment of goods to reflect information on position and condition of the goods. The tag maybe interrogated remotely, and the various readings can be displayed remotely in real time.

The serial number of certain products can be encoded into the modulated reflectance circuitry. This allows the isolation of specific products for the manufacturer to conduct research on tire batches released to the public for quality control purposes.

In the case of items of commerce, often it will be useful to disable or alter labels a particular time. Many customers may desire to have privacy when purchased items are in their possession, and do not want these items to be interrogated without their permission. While labels according to the present invention can be easily mechanically torn, and thus disabled, a non-mechanical RF method is highly desirable.

Such an RF disabling can be easily accomplished by use of a fusible link inserted in the reflector circuitry of the label that is opened by exposure to a specific RF frequency input from a base station as discussed in U.S. Pat. No. 7,095,311. In another technique, an inductive coil can be activated by a specific frequency RF signal such that a special magnetic conductive link is attracted toward the inductive coil and severed, disabling the label.

In actual practice of the present invention, it is important to localize the energy deposition in order to obtain maximum affect from a limited amount of input energy. To achieve this localization in an actual label, it is necessary to print conductive particles coated with a thin layer of a more insulating material. When printed, these particles would be in contact, and the energy deposition would be localized to occur in the insulating coating at the points of contact. This would be either a simple arc process, or a more complex chemically assisted reaction could be initiated.

Of course, any of these can be made as small as printer accuracy permits for energy localization. Any or all of the materials can be chemically active and the contacts where electrical energy is deposited can be of any desired resistance.

In order to prevent unwanted or unintentional disablement of a label, a form of more complex signal than a single frequency or pulse can be used. It is also desirable to require an accurately tuned signal and a form of energy multiplication. For even further complexity of the disable signal, more than one tuned circuit can be used with the voltage for destruction requiring all frequencies to be present at the correct times. This destruction scheme also could be implemented using timed pulse codes rather than, or in addition to delay lines.

5. DNA Authentication

A Deoxyribonucleic acid ("DNA") tag is a self-contained authentication label containing a mix of oligonucleotides that provides a unique signal when appropriately interrogated. The label may be associated with an item to be labeled. A label may be created, for instance, by placing the DNA tag on a surface (such as paper, plastic, or any appropriate substrate) which is then affixed to an item, placing the DNA tag directly on a surface of the item, or mixing the DNA tag in a liquid, or otherwise including the tag in the item. Labels may also be added to various media, including liquids, powders, solids, gels, gases, etc. They may be applied to any external surface or any internal surface of an item to be analyzed.

A DNA reader is a device for interrogating a DNA label to determine its signal and make the association with a unique or known class of signals. In one embodiment, a reader comprises a sensor (or input device) in electrical connection with a computing device which receives the signals from the sensor and, using software, hardware, or a combination of software and hardware, and interprets the signals, to authenticate the labels and/or obtain information from the labels. Other sensors may be employed in other embodiments. In some embodiments the reader should be able to display results and/or transfer data to another device. For Example, data may be transfer either via a direct or network connection or downloading results to a removable storage media.

In one embodiment, a DNA reader allows the user to interrogate the DNA label nearly instantaneously. For example, an RIFD transponder device could be utilized to emit a predetermine signal. The DNA tag could then be constructed with DNA of a known sequence and concentration to emit a signal specific to the DNA loaded in the label. Because the unique combination of DNA concentration and DNA sequence has the capacity to alter RIFD feedback in a predictable and consistent fashion, an ordinary RFID transponder may be utilized to detect the alteration in RFID feedback, associate the altered signal with previously determined signals, and associate the signal feedback with a particular DNA sequence and concentration. Accordingly, the user of a RFID transponder (e.g., a mobile handheld unit) may nearly instantaneously detect the base pair sequence and concentration of DNA present in the tag, effectively authenticating the object.

In another embodiment, laser light, UV radiation or other visible or non-visible electromagnetic radiation may be employed to excite the DNA itself and/or molecules attached to the DNA in the label. Once excited the molecules or the DNA may be visualized and/or interpreted. In preferred embodiments the DNA sequence and concentration may be obtained. Accordingly, some embodiments allow for interrogation of DNA tags instantly and in remote locations.

In other embodiments a rapid, inexpensive, and sequence-specific method for detecting nanogram quantities of DNA sequences may be utilized. For example typical methods have been developed by C. Fan, K. W. Plaxco, and A. J. Heeger. Their method has been described in U.S. Patent Application Publication No. 20040191801 (Ser. No. 10/678,760), "Reagentless, Reusable Bioelectronic Detectors and Their Use as Authentication Devices," filed Oct. 3, 2003, the contents of which are herein incorporated by reference, U.S. Patent Application Publication No. 20050112605 (Ser. No. 10/810,333), "Reagentless, Reusable Bioelectronic Detectors and Their Use as Authentication Devices," filed Mar. 25, 2004, the contents of which are herein incorporated by reference, and in a scientific paper "Electrochemical Interrogation of Conformation Changes as a Reagentless Method for the Sequence-specific Detection of DNA," PNAS, vol. 100, no. 16, pp. 9134-9137 (Aug. 5, 2003), the contents of which are herein incorporated by reference.

In another embodiment the DNA reader may be an entire system of wet chemistry, which may be utilized to definitively interrogate the DNA. Accordingly, various methods of interrogation are available. For example, DNA labels may also be used in orally ingested or injectable drugs, as provided in paragraphs 112 and 113 of U.S. Patent Application Publication No. 20040191801, incorporated herein by reference, and paragraphs 116 and 118 of U.S. Patent Application Publication No. 20050112605, incorporated herein by reference.

Because DNA has an enormous coding capacity, even short sequences of DNA can be highly effective when used in labels to identify, authenticate, and verify an item associated with the label. This has been discussed in U.S. Pat. Nos. 5,139,812 and 6,312,911 which are herein incorporated by reference. More information may be encoded by placing DNA at specific locations in a geometric pattern. For instance, a particular sequence appearing at location "A" may encode one piece of information, and the same sequence appearing at location "B" may encode another piece of information. An array containing n possible DNA locations provides a maximum of n times the information contained in a single location.

The various approaches to authentication using DNA labels, either individually or in combination with other product marking materials, discussed above may be employed to authenticate items at discussed below.

DNA labels may also be employed to authenticate and/or provide information about items other than those noted above. These include, but are not limited to: spare parts; supply chain management schemes; cosmetics; foodstuffs; hair shampoo; perfumes; ink-jet cartridges or toner cartridges for printers; electronics products, components, and circuits; batteries or cells; industrial raw materials; explosives; and other potentially contraband materials. A label may also be added to a message, document, or other communication.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A micro-identifying structure employing passive modulated reflectance comprising:
    a base station emitting a signal;
    a tag, located remotely from said base station, including:
        a substrate;
        at least one antenna;
        at least one oligonucleotide comprising a known sequence structured to form a taggant, wherein the known sequence of the oligonucleotide provides a unique signal when interrogated by the signal emitted from the base station; and
        a network, consisting only of passive components, connected to said antenna.

2. The structure of claim 1, wherein the oligonucleotide taggant comprises DNA.

3. The structure of claim 1, wherein said tag is configured as a label to be applied to an item of manufacture.

4. The structure of claim 1, wherein the tag coats and preserve the organic molecular taggants into an encasement capable of action selected from a list consisting of: being removable, consumable, and recoverable.

5. The structure of claim 1, wherein the product is utilized in association with an object selected from a list consisting of: pharmaceutical products, aerospace parts, automotive parts, precious stones, commodities, food and cereal grains, medical and dental components.

6. The structure of claim 1, wherein said structure may be visualized using a method selected from a list consisting of: naked-eye visible colors, Short Wave electromagnetic emissions, long wave electromagnetic emission, infrared electromagnetic wave emission, UV emissions, and optical object recognition sensors.

7. The structure of claim 1, wherein said taggant is detached from a product and prepared for a forensic analysis.

8. The structure of claim 1, further comprising another molecular beacon within an encapsulated matrix, which is utilized as a unique beacon, within an RFID matrix; each used alone or in combinations to enhance security coding.

9. The structure of claim 2, wherein the concentration of DNA is specified and utilized as a tool for detection and authentication.

10. The structure of claim 9, wherein quantitative PCR is utilized to identify the number of DNA molecules present.

11. The structure of claim 1, wherein the concentration of the organic product is specified and utilized as an identifying feature.

12. The structure of claim 1, where in the resident organic product remains quantifiable for purposes of detection and authentication even if the structure has be broken or adulterated.

13. The structure of claim 3, wherein the micro-identifying structure employing passive modulated reflectance is comprised of at least two distinct parts, wherein each part possesses properties unique from the other, such that only the security system product owner knows which component contains the marker.

14. The structure of claim 13, wherein the at least two distinct parts together form a unique marker.

15. The structure of claim 1, wherein the taggant is applied using material which does not reflect light in the visible light spectrum selected from a list consisting of: pigments, varnishes, coatings and adhesives.

16. The structure of claim 2, wherein said DNA is DNA selected from an extremophile.

17. The structure of claim 1, wherein said network is configured to enable said reflected modulated signal to determine the location of said tag.

18. The structure of claim 1, wherein said network is configured to enable said reflected modulated signal to identify an entity to which said tag is associated.

19. The structure of claim 1, further comprising means for disabling operation of said tag.

20. The structure of claim 1, where in the passive components of the network comprise components selected from the group consisting of resistors, capacitors, inductors, and connecting conductors formed by printing said passive components onto said substrate, where said network is configured to reflect back to said base station the signal modulated to be indicative of the characteristics related to said tag.

21. The structure of claim 1, wherein said network is configured to obtain a binary code in said modulated reflected signal that identifies the particular user of the tag.

22. The structure of claim 21, wherein said at least one antenna comprises two antennas, a first of said two antennas being out of phase with a second of said two antennas to induce said binary code in said modulated reflected signal.

23. The structure of claim 21, wherein said network includes time-delay circuits comprising combinations of inductances and capacitances to induce said binary code in said modulated reflected signal.

24. The structure of claim 1, wherein said network includes varying impedances connected to at least one antenna to induce said binary code in said modulated reflected signal.

25. A method of tracking or identifying an object comprising the steps of:
   sending a signal from a base station;
   passively receiving the signal at a tag located at a location remote from said base station, wherein said tag comprises:
      a substrate, at least one antenna and at least one oligonucleotide comprising a known sequence, wherein said known sequence of the oligonucleotide provides a unique signal when interrogated by the signal sent from the base station;
   reflecting a known unique signal from the tag back to the base station, where said tag is configured to reflect back to said base station a specific signal modulated to be indicative of characteristics related to said tag.

26. The method of claim 25, wherein the taggant may be detached from the unit dose jacket to be prepare for forensic analysis.

27. A method of making a micro-identifying structure employing passive modulated reflectance comprising the steps of:
   forming a thee-dimensional array of droplets on a substrate, the array comprising droplets comprising at least one oligonucleotide comprising a known sequence, wherein said known sequence of the oligonucleotide provides a unique signal when interrogated by a signal emitted from a base station.

28. The method of claim 27, wherein the droplets that form the structure are of a first material, and the three-dimensional array further comprises droplets of a second material disposed on outer surfaces of the structure deposited with the first material.

29. The method of claim 28, wherein the forming a three-dimensional array comprises:
   depositing the droplets in a series of layers, the layers including droplets of a third material.

30. The method of claim 27, wherein droplets of one of the layers is removed utilizing a solvent that does not dissolve droplets from the other layers.

31. The method of claim 27, wherein the forming comprises depositing the droplets through a print head.

32. The method of claim 31, wherein the print head comprises an ink jet print head.

33. A method making a micro-identifying structure employing passive modulated reflectance comprising the steps of:
   depositing a plurality of layers of droplets on a substrate comprising a series of tags, the droplets comprising at least one oligonucleotide comprising a known sequence, wherein said known sequence of the oligonucleotide provides a unique signal when interrogated by a signal emitted from a base station to form a plurality of unique structures on each of the tags;
   depositing a additional material onto the unique structures, wherein the passive reflectance system on each tag comprises a structure which enables passive reflectance of a designated wavelength and frequency.

* * * * *